United States Patent [19]
Smith et al.

[11] 3,804,702
[45] Apr. 16, 1974

[54] INSULATIVE STRUCTURAL MATERIAL

[75] Inventors: North Smith, Cornish Flat, N.H.; Daniel A. Pazsint, Wampum, Pa.

[73] Assignee: The United States of America as represented by the Secretary of the Army, Washington, D.C.

[22] Filed: June 20, 1972

[21] Appl. No.: 264,638

[52] U.S. Cl............. 161/168, 161/403, 260/2.5 B, 260/2.5 HB
[51] Int. Cl............................ B32b 5/16, B32b 5/18
[58] Field of Search.......... 161/168, 403; 260/2.5 B, 260/2.5 HB

[56] References Cited
UNITED STATES PATENTS
3,542,701  11/1970  Van Raamsdonk.............. 260/2.5 B Primary Examiner—William J. Van Balen
Attorney, Agent, or Firm—Edward J. Kelly; Herbert Berl; Lawrence E. Labodini

[57] ABSTRACT

An insulative, solid structural material consisting of an expanded polystyrene bead aggregate bound into a rigid cohesive unit by elemental sulfur. Molten sulfur, at a temperature below 120°C., is added to the pre-expanded polystyrene bead aggregate in a mold and allowed to cool and solidify. The sulfur binds tightly to the aggregate, fills the spaces between the aggregate and forms a finished surface that acts as a moisture barrier.

6 Claims, No Drawings

INSULATIVE STRUCTURAL MATERIAL

The invention disclosed herein may be manufactured, used and licensed by or for the Government for governmental purposes without the payment to us of any royalty thereon.

BACKGROUND OF THE INVENTION

This invention relates to insulative structural materials and, more particularly, to an expanded polymer bead aggregate cemented rigidly together by elemental sulfur.

Insulative, structural materials are useful for many specialized applications, including roadbed insulation, building materials, roofing materials, containers or other applications wherein low heat transfer and structural rigidity are desired. The best insulation materials available, such as synthetic polymer foams, expanded polymer bead, etc., have relatively poor structural properties, i.e., low compression and flexural strengths. Most conventional structural materials, on the other hand, exhibit only fair to poor insulative properties. Attempts to upgrade the insulative properties of structural materials such as concrete, by incorporating into the aggregate certain substances having good thermal properties have only been partially successful. This invention provides rigid, structurally useful, highly insulative materials that may be formed in any desired shape by combining a lightweight, insulative aggregate with a fast-curing, binding material.

SUMMARY OF THE INVENTION

Insulative, solid structural materials are formed by cementing expanded polymer structures or beads together into a rigid, cohesive unit with elemental sulfur. Sulfur is added in a molten state to a container or form containing an expanded or expandable polymer aggregate, filling the spaces between the aggregate, and thereafter is allowed to cool and to solidify. The solid sulfur serves to bind or cement the aggregate into a rigid, lightweight, insulative structure. The temperature of the molten sulfur is held below 120°C. and the size of the aggregate particles is not more than 0.50 inches in maximum dimension. Inasmuch as the molten sulfur solidifies and sets upon cooling, the resulting structure is quickly cured to a rigid configuration. The polymer beads constitute from 55% to 65% by volume of the volume of the composite and from 1.0% to 2.5% of the total weight of the composite.

DESCRIPTION OF THE PREFERRED EMBODIMENTS

It has been found that shaped structures of considerable strength and excellent thermal insulation qualities can be obtained by employing elemental sulfur as a cementing material in combination with certain lightweight aggregate materials. The structures can be formed to nearly any desired shape by casting, molding, spraying or any other suitable forming or shaping technique.

The aggregate material used in the present invention consists of expanded or expandable polymer beads or structures. Preferred, for purposes of this invention, are pre-expanded polystyrene beads. The size of the expanded beads will range from 0.10 to 0.50 inches in diameter and the preferred size is less than 0.20 inches in maximum diameter. The density of the beads is from 0.7 to 1.2 lbs. per cubic foot. The size, shape, concentration and density of the aggregate will effect the physical properties of the resulting structure or product. The polystyrene bead aggregate constitutes from 55% to 65% by volume of the composite structure.

Elemental sulfur acts as a binding agent to hold the adjacent aggregate beads rigidly to each other, fills the void spaces between the aggregate particles and forms a finished surface that functions as a moisture barrier. Sulfur is added to the aggregate in a liquid or molten state which is produced by heating dry solid sulfur above its melting point, approximately 112°C. at atmospheric pressure. The temperature of the molten sulfur is maintained below 120°C. to minimize melting of the polystyrene aggregate. On cooling below 112°C., the molten sulfur solidifies to a rock-like consistency. Sulfur constitutes from 35% 45% by volume of the composite structure. Plasticizers, such as ethylene polysulfide or cyclooctadiene may be added to the sulfur in amounts up to about 5% by weight of the sulfur to reduce the brittle properties of the resolidified sulfur. Fire retardants, such as antimony chloride may also be added to the molten sulfur if special fire resistant properties are required.

In general then, pre-expanded polymer beads are placed in a mold or form to which molten sulfur will not adhere on solidifying, and molten sulfur is subsequently poured into the mold to the desired level. The sulfur is allowed to cool and solidify and the sulfur-polystyrene composite structure is then removed from the mold. Once the sulfur has solidified, the curing of the sulfur-polystyrene bead composite is completed. Because of the fact that the molten or liquid sulfur sets up or cures as it cools below its melting point, sulfur-polystyrene bead composites can be formed at ambient temperatures below those at which concrete can reasonably be formed.

The following are examples of the best contemplated method and products of the present invention:

EXAMPLE 1

One hundred pounds of sulfur are placed in a melting tank and heated by indirect heating until completely melted. The temperature of the molten sulfur is maintained at 120°C. until added to the aggregate. Pre-expanded polystyrene beads, having a bead diameter in the range of 0.10 to 0.17 inches, are heated to 50°C. in a vacuum to remove as much of the blowing agent as possible. 2.5 pounds of thus treated polystyrene beads, having a bulk density of 1.2 lb. per cu. ft. are placed in a rectangular metal mold and 97.5 lbs. of molten sulfur are then poured into the mold. Upward floatation of the beads is prevented by placing a ⅛ inch seive tightly over the top of the mold. The composite is cooled in the mold at room temperature, or at lower temperatures and after the sulfur has solidified, the mold is opened and the sulfur-polystyrene bead composite structure removed. The density of the composite structure is 51.0 lb. per cu. ft. The polystyrene beads constitute 61.4% by volume of the structure and the sulfur the remaining 38.6% of the volume. Examination of the interior of the structure revealed a good bond between the beads and the sulfur. Thermal conductivity, determined in accordance with ASTM Test Method C 177, was found to be 0.58 Btu-inch/hr. sq. ft./°F. at 40°F. Water absorption (ASTM Test Method D 2842) of the composite was 6.3% by volume.

EXAMPLE 2

Following the procedures of Example 1, composite structures of preexpanded polystyrene beads and sulfur were formed using beads of different diameters. The molten sulfur was introduced into the bottom of the mold to facilitate filling of the voids between the beads. The percentage by volume and weight of the composite and the resulting composite density are shown in the following table:

TABLE I

| Bead Dia. inches | Bead Bulk density, pcf | % by Vol Beads | % by Vol Sulfur | % by Weight Beads | % by Weight Sulfur | Optimum or Max. Composite density pcf |
|---|---|---|---|---|---|---|
| 0.13 – 0.20 | 0.9 | 59.7 | 40.3 | 1.8 | 98.2 | 52.9 |
| 0.30 – 0.50 | 0.7 | 57.8 | 42.2 | 1.3 | 98.7 | 55.1 |
| Mixture of 50/50 by Vol. 0.10 – 0.17 and 0.30 – 0.50 | 0.95 | 62.4 | 37.6 | 1.9 | 98.1 | 49.5 |

The thermal conductivities of these composites were similar to those of Example 1. The composites were subjected to a freeze-thaw test (ASTM Test Method C 291) wherein they were cycled between 25° and 72°F. and exhibited no signs of failure after 15 cycles. Compressive strength after the freeze-thaw test determined (in accordance with ASTM Test Method D 1621) was 66–86 psi.

The foregoing examples and description of the invention are by way of illustration only. Those skilled in the art will recognize that the principles of the invention may be applied in several ways, only a few of which have been exemplified herein specifically. Accordingly, the invention is to be limited only by the spirit thereof and the scope of the appended claims.

We claim:

1. An insulative, rigid, solid, structure consisting of an expanded polystyrene bead aggregate and an elemental sulfur binding agent which agent holds the adjacent aggregate beads rigidly to each other and solidly fills the spaces between the aggregate particles, said aggregate constituting from 1.0% to 2.5% of the total weight of the structure.

2. An insulative, rigid, solid, structure according to claim 1 wherein the particle size of the aggregate is not more than 0.50 inches in diameter.

3. An insulative, rigid, solid, structure according to claim 2 wherein the sulfur constitutes from 35% to 45% by volume of the structure.

4. An insulative, rigid, solid, structure according to claim 3 wherein the bulk density of the aggregate beads is from 0.7 to 1.2 lbs. per cubic foot.

5. In insulative, rigid, solid, structure according to claim 4 wherein the sulfur contains an effective quantity of a sulfur plasticizing agent.

6. An insulative, rigid, solid, structure according to claim 5 wherein a particle size of the aggregate is from 0.10 to 0.20 inches in diameter.

* * * * *